United States Patent Office 2,843,509
Patented July 15, 1958

2,843,509

PROCESS FOR REMOVAL OF CARBONACEOUS DEPOSITS

Benjamin Arden, Los Angeles, Calif., assignor to Turco Products, Inc., Los Angeles, Calif., a corporation of California No Drawing. Application May 25, 1955
Serial No. 511,098

11 Claims. (Cl. 134—39)

This invention relates to removal of carbonaceous deposits, containing carbon, asphaltenes, tars, resins, and other binders which may include inorganic contaminants in the form of metallic oxides and salts.

One important present application of my invention is to power plants of modern aircraft, particularly jet engines, such as turbojet and turboprop power plants, which are constructed from special heat resistant alloys and super-alloys. During service the various component parts are exposed to high operating temperatures in the vicinity of 1000–1500° F. or even higher. At these elevated temperatures the metal alloys are exposed to both reducing and oxidizing atmospheres at various times, and, as a result, very tightly adherent scale deposits are formed on the hot parts of the engine.

Examples of components of jet engines which are covered with scale deposits are the combustion chamber inner liner, cross-over tubes, transition liner, turbine nozzle assembly, and turbine rotor assembly (with attached buckets), exhaust components, and, in some models, the after burner.

The types of scale formed on these engine parts include leaded scale, such scale being composed essentially of lead salts such as the oxides and halides of lead, e. g., $PbO$, $PbO_2$, $Pb_2O_3$, $Pb_3O_4$, and under some conditions some free lead, and $PbX_2$ where X is a halogen such as chlorine or bromine, and in many cases it may also include other salts, such as phosphates and carbonates. Such deposits are also found on certain component parts of the piston type of internal combustion engines powered by leaded fuels. These salts will vary in color from white to yellow, orange, red and brown. The composition of the deposit depends in large part on the composition of the fuel and the atmospheric environment in which it is burned, for example, fuels containing tetraethyl lead, organic halides and organic phosphates, such as tricresyl phosphates These deposits are also modified by organic additives which enter the combustion chamber, especially in reciprocating engines, with the lubricant and which combine with the lead to form various components of the deposits. Deposits thus formed by burning of fuels containing lead compounds are in this specification and these claims referred to as "leaded deposits."

Leaded deposits are thus formed at elevated temperatures because of the presence of lead-containing antiknock compounds in aviation (or other) fuel, and such deposits are frequently formed on metal surfaces which are covered with heat scale with which the leaded deposits are commingled and on which the leaded deposits may be found.

Also formed on the surface of the engine parts is a tough carbon or graphite scale which tightly adheres to the metal surfaces. In describing these scales as carbon or graphite scales, I do not exclude the presence in the carbon deposit of high molecular weight asphaltene or asphaltic or tarry binders which are formed in the burning of the fuel. These deposits are found both intermingled with and deposited on the heat scale and leaded deposits. In many cases massive carbon deposits are formed because of severe conditions of engine operation, especially in the case of "hot" spots. The heat scale formed on components of jet engines and other types of engines operating at high temperature under oxidizing conditions is a scale of oxide character known as "heat scale," which is deposited because of high temperature oxidizing conditions. Thus, at high temperatures of operation, e. g., existing in operation of jet engines, a heat scale is formed which is largely a mixture of the oxides of the metals, or of the metal alloys of which the engine parts are constructed.

For proper maintenance of the engines, overhaul procedures must be applied during which the engine components are completely and safely cleaned of heat scale deposits, and any other contamination which may be present, such as leaded deposits and deposits of carbon. One of the most important reasons for removing the foreign matter and scale deposits is to provide clean metal surfaces which are suitable for inspection for flaws by standard techniques. Inspection is especially important for jet engine parts which are highly stressed, such as nozzle guide vanes and turbine buckets.

One object of the invention is to remove leaded deposits formed on engine components, particularly, but not exclusively, the "hot" sections of aircraft engines, especially jet engines.

Another object is to devise a procedure and compositions for the efficient removal of carbonaceous deposits from parts carrying the same.

Other objects and advantages will be apparent from the description of my invention which follows:

I have found that carbonaceous deposits and heat scale can be removed from engine parts, such as jet engine "hot section" components, by treatment of such parts in an alkaline solution of polyalkanolamines at elevated temperature. The metals and alloys previously referred to are stable and not corroded in any substantial degree in solutions of such alkalinity.

I have found that the addition of phenol compounds and/or alkanolamines, particularly polyalkanolamines and polyalkanolpolyamines, to the treating bath, as described more fully hereinafter, improves the action of the bath on the parts, especially as regards carbon and heat scale removal.

The aqueous alkali solution of the invention contains as its alkalinity producing agent an alkali metal compound which in solution gives free alkali metal hydroxide which may be potassium or sodium hydroxide. Potassium hydroxide is preferred, although sodium hydroxide is also suitable. A substantial amount of alkali of this type is employed in order to attain the high pH values necessary for proper functioning of the solution. The pH of the descaling solution hereof is maintained substantially above 12, and is generally not less than about 13. Solutions of alkali which are preferred have values of the pH of the solution above about 13, and may be 14 or even higher. Actually at such high pH values it is more common practice to describe the alkalinity in terms of percent sodium hydroxide or potassium hydroxide, or some other equivalent alkali metal hydroxide. The amount of alkaline material employed may range to give in solution free alkali metal hydroxide equivalent to from about 4% to about 40% by weight alkali metal oxide, e. g. ($K_2O$,$Na_2O$), based on the weight of the solution. Preferably from about 10–25% of alkali, most desirably potassium hydroxide, is used to obtain the desired high alkalinity.

The compatible alkanolamines which can be used are alkanolamines, and preferably polyalkanolamines, having boiling points, in the pure state, of 400° F. and higher and having preferably a vapor pressure at 20° C. of less than 0.01 mm. of mercury. By compatible alkanolamines, I mean those which form stable dispersions or solutions in the water system of the composition of my invention at the operating temperatures of 200 to 300° F. and are not decomposed by pyrolysis at such temperatures under the conditions of proposed use. Examples of the polyalkanolamines with their boiling points and vapor pressures (at 20° C.) are set out below:

TABLE 1

| Name | Boiling Pt. at 760 mm. pressure | | Vapor pressure, mm. Hg at 20° C. |
|---|---|---|---|
| | ° C. | ° F. | |
| Diethanolamine | 250 | 480 | Less than 0.01. |
| Triethanolamine | 360 | 680 | Do. |
| N-Aminoethyl Ethanolamine | 244 | 471 | Do. |
| N-Methyl diethanolamine | 247 | 476 | Do. |
| N-Ethyl diethanolamine | 252 | 485 | Do. |
| Diisopropanolamine | 249 | 480 | Do. |
| Triisopropanolamine | 306 | 583 | Do. |

Other suitable polyalkanolmonoamines are N,N-dihydroxyethyl glycine, and glycol or polyglycol derivatives of triethanolamine and polyetherglycol derivatives of triethanolamine having the general constitutional formula

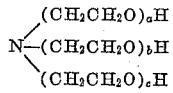

where $a+b+c$ equals from 3-6, both inclusive.

I may also use polyalkanolpolyamines having boiling points above 400° F. and similar low vapor pressures such as the polyalkanolpolyamines referred to below. I may use such polyalkanolpolyamines in the place of the polyalkanolmonoamines in like weight proportions or employ the polyalkanolpolyamines together with the polyalkanolmonoamines in the ratio and manner described hereinbelow to assist and improve the carbon and heat scale removal.

The amount of high boiling compatible polyalkanolamines which can be employed generally ranges from about 1 to about 30%, and preferably about 10 to about 25%, by weight of the solution. When using polyalkanolpolyamines, the amount employed will depend on their solubility, and if insufficiently soluble the polyamines can be supplemented by addition of polyalkanolmonoamines.

I have also found that phenols in the form of alkali metal phenates, such as the potassium and sodium phenates, when added to the solutions of the invention aid substantially in promoting carbon removal. Thus, I may employ the phenols, i. e., the monatomic phenols such as hydroxybenzene and its homologues including cresol and cresylic acid, polyatomic phenols such as the dihydroxybenzenes and its homologues, triatomic phenols such as pyrogallol and its homologues, and higher polyphenols, which are sufficiently acid to form salts with alkali at the concentrations employed which are soluble in the aqueous compositions of my invention at the temperature of the treatment, to wit, at 200–300° F. The alkali metal salts I have found effective in this respect are the salts of phenol itself, the ortho, meta and para dihydroxy benzenes, and of the trihydroxy benzenes such as pyrogallic acid. These materials are generally compatible with my alkali solutions. Hence, such materials can be employed as additive to the treating reagent. It may be used with the alkanolamines to give some improvement effective in further aiding carbon removal and assist in raising the boiling point, i. e., suppress the vapor pressure of the solution. Such phenates may be employed in amounts ranging up to about 20% by weight of the solution, generally about 3 to 15%.

The alkanolamines in addition to their effect on the boiling point of the alkali solutions have in themselves an influence on the chemical reactivity of the solution in removal of carbon deposits.

In order to raise the boiling point and reduce the vapor pressure of the alkali solutions so that they may be employed at the desirable elevated temperature for the decarbonizing procedures of my invention, I may incorporate in the solutions soluble salts, particularly those which will not impart corrosive properties to the solution. For such purposes I may employ a soluble salt, preferably an alkali metal salt of such molecular weight so as to give sufficient suppression of vapor pressure for the purpose of this invention, and which will not corrode the metal in any substantial degree under the conditions of operation. These salts may be the soluble sodium or potassium salts with sufficient high solubility in the water solutions at the temperatures employed, e. g. 200–300° F., to give the desired boiling point rise. Such salts may be the alkali metal salts of the low molecular weight fatty acids, for example, acetates and propionates, or of the aliphatic hydroxy acids, lactic, citric, tartaric, gluconic, glyceric, malic, glycolic, or saccharic acid. Such salts may be the alkali metal salts of the inorganic acids which form the above-mentioned stable salts, to wit, the ortho or meta phosphates, polyphosphates, carbonates, particularly the sodium potassium carbonate, nitrate, sulfate, either the sodium salt or the equivalent potassium salts. While the acids may be used to form the salts in situ, the solution after neutralization should have the alkalinity referred to. These salts may be used in amount ranging from about 1% to about 40% by weight of the solution with about 4% to 40% by weight being usually employed. They are used in such concentration so that, giving effect to any polyalkanolamine also employed, the solutions will have boiling points above the average temperatures employed in the decarbonizing process.

The compositions of my invention containing alkanolamines or its equivalent alcoholates include from 10 to 25% of alkali metal hydroxide, 5 to 45% of salts, and from 0 to 15% of phenates, and from 10 to 25% of alkanolamines and sufficient water to make 100% by weight, employing at least about 25% of water in the solution. As a further improvement, I may adjust the above ratios of the components of the composition so that there is little and preferably an inconsequential amount of water evaporated at the treating temperature. The above mixtures have a boiling point which is in the range from 220 to over 300° F. and is preferably higher than the average temperature of the bath.

While I do not wish to be bound by any theory of the reaction, I do not exclude the possibility that in the aqueous solution more or less of the alkanolamines are reacted with alkali to form equivalent alcoholates and the ultimate compositions as described are intended to include such possible conversion.

In employing the above ingredients to form the alkaline solution, I may adjust the quantities so that the alkali employed may be divided between free alkali and alkali bounds as alcoholate of the alkanolamine and dissolve the mixture in water.

In practice the treating or removing composition of the invention is heated in a suitable container or tank, e. g., constructed of stainless steel or Monel metal, to the operating temperature, and the engine parts encrusted with carbon deposits are immersed therein. Temperature of the solution during treatment is maintained in the range of 200–300° F., usually 235 to 280° F. The preferred temperature range is about 255 to 280° F. The solution has a boiling point higher than the treating temperature and is in excess of about 220–300° F. and usually about 300° F. Where the tank is heated by steam coils, the temperature adjacent the coils may be above the boiling temperature. However, the average temperature of the solution is as stated. The time of treatment in the above alkaline solution is generally from about 15 minutes to about 2 hours, depending on the amount and tenacity, particularly as regards carbon, of the scale to be removed. Usually from 30 to 45 minutes at about 270° F. is sufficient for this purpose. The parts are then withdrawn from the solution and spray rinsed with either cold or warm water.

The alkali solutions described above for removing scale produce no measurable corrosion of the metal of which the engine part is constructed, during the cleaning or descaling operation. Hence, no weakening or dimensional change in the metal part is effected by the invention process.

In many instances extremely hard, massive, and highly adherent carbon deposits and heavy glazed layers of heat scale are formed during severe conditions of engine operation, which are most difficult to remove by the above procedures employing the polyalkanolmonoamines without exposing the parts for prolonged and impractical and inconvenient periods of time.

I have found that by addition of a polyalkanolpolyamine to the above alkali solutions, the removal of tenacious carbon deposits often formed on hot parts of engines, particularly jet engines may be facilitated. The amount of the polyalkanolpolyamines to be added is decreased by employing the polyalkanolpolyamines together with the polyalkanolmonoamines as described herein, and in my preferred embodiment I employ the polyalkanolpolyamines together with the polyalkanolmonoamines. The result is an improvement in overall cleaning ability and performance particularly in the rate of removal of the carbon scale.

Examples of suitable polyalkanolpolyamines for purposes of the invention are as follows:

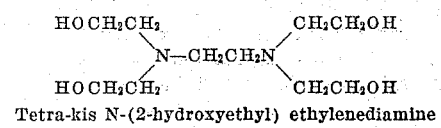

Tetra-kis N-(2-hydroxyethyl) ethylenediamine and

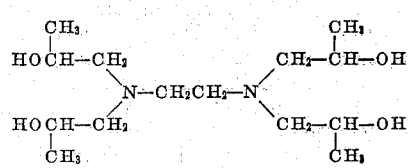

Tetra-kis N-(2-hydroxypropyl) ethylenediamine and N,N'-dihydroxyethyl ethylene diamine, tetraethanol propylene diamine, pentaethanol diethylenetriamine, and hexaethanol triethylenetetramine. The preferred compounds of this type are the polyalkanoldiamines, in particular N,N,N',N' tetra-kis (2-hydroxypropyl) ethylenediamine and the 2-hydroxyethyl analog. The amount of polyalkanolpolyamine employed can vary. When used together with polyalkanolmonoamines the amount generally used is in the range of about 0.2 to 5% by weight of the solution, employing therewith additional polyalkanolmonoamines sufficient to make the total polyalkanolamine content preferably equal to about from 10 to 25% of the solution. Preferably, I employ from about 1 to about 5% by weight of the polyalkanolpolyamines and from about 9 to about 22% by weight of the polyalkanolmonoamines based on the weight of the solution. The quantity of this material which can be utilized will, of course, be limited by the solubility of the polyalkanolpolyamine employed.

Using the solutions which do not contain the polyalkanolpolyamine, the amount of carbon removal may be between 75 and 90%, depending on the density and the character of the carbon deposit, whereas practically 100% of the carbon of the hard and dense kind encountered in extreme cases can be removed under the same conditions but employing alkali solutions including a polyalkanolpolyamine such as N,N,N',N' tetrakis (2 hydroxypropyl) ethylenediamine. I have found that (depending on the character of the carbon deposit) employing the solutions of my invention containing polyalkanolamines and not containing polyalkanolpolyamines, I may remove about 100% of the carbon deposit encountered in jet engines and about 75% of the carbon found in jet engines operating under adverse conditions.

The following examples are given to illustrate the application of my invention employing the various treating reagents and the comparative results obtained.

*Example 1*

A combustion chamber inner liner having a heavy leaded deposit and heat scale and carbon was treated with the following solution at 200–210° F.:

| | Percent by weight |
|---|---|
| Sodium hydroxide | 16.0 |
| Sodium acetate | 1.6 |
| Potassium sodium tartrate | 2.4 |
| Water | 80 |
| | 100 |

After one hour of treatment but a fraction, estimated as from 5–10%, of the lightly adherent carbon and heat scale was removed. Lightly adherent carbon was washed off, but the hard graphitic carbon forming the major portion of the carbon deposit was not removed, nor was it removed after 1½ hours of exposure.

*Example 2*

Comparing this result with the use of caustic soda alone (15% solution at 200–210° F.) a similar combustion chamber inner liner, taken from an engine operating under the same conditions and like service and having a closely similar type of deposit as in the above case, after 1 hour of treatment only a fraction of the adherent carbon deposit was removed. The part was not cleaned.

*Example 3*

An inner liner similarly contaminated as in Example 1 was treated under the same conditions as in Example 1 at 200–210° F. with the following reagent:

| | Percent by weight |
|---|---|
| Potassium hydroxide | 17 |
| Triethanolamine | 15 |
| Water | 68 |
| | 100 |

After 35 minutes treatment, only a portion of the carbon was removed. However, this was better than in Example 1.

*Example 4*

A composition according to this invention and consisting of free potassium hydroxide, potassium salts (which complex and solubilize lead ions), water, and water compatible non-volatile solvent is as follows:

| Ingredient: | Composition A percent by weight |
|---|---|
| Potassium glycolate | 22.50 |
| Potassium acetate | 6.53 |
| Potassium hydroxide | 16.64 |
| Potassium phenoxide | 5.81 |
| Triethanolamine | 13.82 |
| Water | 34.70 |
| | 100.00 |

Uniform homogeneous compositions of this type are prepared by mixing the above ingredients, or more conveniently, in practice, by dissolving the equivalent proportion of commercial potassium hydroxide in the water-triethanolamine solvent mixture and forming the respective potassium salts by proportionate additions of the corresponding free acids, namely, glycollic acid, acetic acid, and phenol.

The scale remover composition A is heated in a suitable container or tank, constructed of stainless steel or Monel, to a temperature of 255–275° F., preferably at 270° F. plus or minus 5° F., and engine parts heavily contaminated with carbon are immersed for a period from 15 minutes to 90 minutes in the solution. For example, an inner liner of a combustion chamber of a jet engine with a heavy deposit will be cleaned in about 15 minutes in the average case. A particularly obdurate part, such as for example the aft section of the combustion chamber inner liner of a jet engine, may take 90 minutes. A power recovery turbine wheel on a turboprop engine may take 10 minutes. The parts are removed and spray rinsed with a pressure spray of either cold or warm water or steam. The amount of carbon removed in the above periods of time is much greater than can be obtained by the treatment employed in Examples 1 to 3 on like parts for the same period of time.

The above treatment is effective in removal of carbon deposits found in the usual case. However, as will be described below, carbon deposits are sometimes encountered in engine deposits which are not removed by the above treatment. In such case the removal may be effected by employing together with the triethanolamine or any equivalent polyalkanolmonoamine employed some polyalkanolpolyamine, as is described herein.

Further illustrating the results obtained, an inner liner of a jet engine combustion chamber was treated with the above solution for under one hour at 270° F. and gave 100% removal of carbon.

An inner liner of a second jet engine when treated with the above solution containing triethanolamine gave only 80% removal of carbon in 2 hours, the carbon being of extremely thick and of especially obdurate and resistant character.

A turbine bucket of a jet engine was treated with the above solution containing the triethanolamine at 275° F. for 1 hour and resulted in a complete carbon removal.

*Example 5*

A combustion chamber inner liner for a jet engine contaminated in a manner equivalent to that of Example 1 was treated according to the procedure of Example 4 at 270–275° F. employing the following solution:

| | Percent by weight |
|---|---|
| Sodium hydroxide | 12 |
| Sodium acetate | 12 |
| Potassium glycollate | 15 |
| Triethanolamine | 15 |
| Water | 46 |

All of the carbon deposit was removed after one hour treatment. Turbine buckets from a turbojet engine were treated with the above solutions at 270–275° F. and all of the carbon was removed in about 3 to 3½ hours treatment.

Stainless steel exhaust stacks of an internal combustion engine when treated in the above manner were completely cleaned of carbon by treatment for about 1½ to 2 hours.

*Example 6*

A result similar to those given in Example 5 is obtained by using instead of the above composition a treating solution employing the following:

| | Percent by weight |
|---|---|
| Potassium hydroxide | 16 |
| Sodium acetate | 10 |
| Potassium glycolate | 20 |
| Triethanolamine | 12 |
| Potassium phenate (from phenol) | 6 |
| Water | 36 |

The time for removal of the carbon is somewhat shortened, the carbon being removed in less than 1 hour.

TABLE II

The results obtained in the above examples may be tabulated as follows. It is to be noted that in the case where no organic high boiling solvent is employed the temperature tried was 200–210° F., being near the boiling point of the solution, and any higher temperature would cause boiling with an impractical amount of evaporation of water.

PART—JET ENGINE COMBUSTION CHAMBER INNER LINER

| Composition | Example | Temperature, °F. | Time to remove carbon |
|---|---|---|---|
| Caustic | 2 | 200–210 | Small fraction in 1 hr. |
| Caustic plus salts | 1 | 200–210 | 5–10% in 1 hr. |
| Caustic plus alkanolamine | 3 | 200–210 | 25% in 1 hr. |
| Caustic plus salts plus polyalkanolamine | 5 | 270–275 | 100% in 1 hr. |
| Caustic plus salts plus phenate plus polyalkanolamine | 4 | 270–275 | 100% in less than 1 hr. |

*Example 7*

Composition A of Example 4 is changed by replacing 3 parts by weight of triethanolamine per 100 parts of the composition with 3 parts by weight of tetra-kis N(2-hydroxypropyl) ethylenediamine, to form a solution of composition B which is the same as composition A except that it contains 10.82% by weight triethanolamine and 3% by weight N,N,N',N' tetra-kis (2-hydroxypropyl) ethylenediamine.

A combustion chamber inner liner covered with thick carbon deposits in the dome section of the type referred to in Example 4 is immersed in composition B at 270–275° F. for 2 hours, in the manner described in connection with Example 4, and then spray rinsed. The leaded deposit and carbon deposits are completely removed.

An inner liner similarly contaminated to that reported in the Example 4 as giving but an 80% carbon removal when treated by the procedure and the reagent of Example 4, when treated in the same manner as in Example 4 and with the same reagent except that it contained also polyalkanolpolyamines, resulted in 100% of carbon removal after 1½ hours treatment. This may be compared with the results given in Example 5 for the similar inner liner employing the reagent of Example 5 and which gave but 80% removal after 2 hours treatment.

A turbine bucket of a jet engine similar to that described in connection with Example 5 and similarly contaminated when treated under the same condition as given under Example 7 employing the reagent containing the polyalkanolpolyamine given above gave, after 1 hour treatment, complete carbon removal.

The introduction of the N,N,N',N' tetra-kis (2-hydroxypropyl) ethylenediamine compound in composition A materially improves the decarbonizing rate of the resulting composition B.

The following table tabulates the above results:

TABLE III

| Part | Treatment | Percent carbon removal |
|---|---|---|
| Combustion chamber inner liner of jet engine | Composition A (Example 5), 1 hour. | 100 |
| | Composition B (Example 7), 1 hr. | 100 |
| Combustion chamber inner liner of jet engine | Composition A (Example 4), 2 hrs. | 80 |
| | Composition B (Example 7), 1½ hrs. | 100 |
| Turbine buckets | Composition A (Example 4), 1 hr. | 100 |
| | Composition B (Example 7), 1 hr. | 100 |

It is thus seen that the use of the polyalkanolpolyamine, N,N,N',N' tetra-kis (2-hydroxypropyl) ethylenediamine, enhances cleaning (carbon removal), in a given time which is practical for production, by about 15–20%.

*Example 8*

The following are illustrative of additional scale removal compositions or solutions which can be used for removing carbon, either alone or in the presence of heat scale, and lead deposits formed from fuels containing tetraethyl lead, according to the invention, with ranges as to amounts of ingredients which can be utilized being set forth for the composition.

| Ingredient: | Percent range, by weight |
|---|---|
| Potassium glycollate or other salt | 10–25 |
| Potassium acetate | 2–10 |
| Potassium hydroxide | 15–25 |
| Triethanolamine | 12–15 |
| N,N,N',N'-tetra-kis (2-hydroxypropyl) ethylenediamine | 1–3 |
| Water—balance to 100%. | |

As a specific example:

| | Percent by weight |
|---|---|
| (a) Potassium hydroxide | 14.0 |
| Potassium acetate | 8.0 |
| Potassium glycolate | 20.0 |
| Potassium acid tartrate | 2.0 |
| Triethanolamine | 10.0 |
| N,N'-dihydroxyethyl ethylenediamine | 5.0 |
| Water—balance to 100%. | |
| (b) Potassium hydroxide | 15.0 |
| Potassium acetate | 8.0 |
| Potassium glycolate | 20.0 |
| Triethanolamine | 12.5 |
| N,N,N',N'-tetra-kis (2-hydroxypropyl) ethylenediamine | 2.5 |
| Water—balance to 100%. | |
| (c) Potassium hydroxide | 18.0 |
| Potassium acetate | 10.0 |
| Potassium glycolate | 20.0 |
| N,N'-(dihydroxyethyl) ethylenediamine | 12.0 |
| Water—balance to 100%. | |

*Example 9*

Results similar to those of the examples employing triethanolamine are obtainable by employing a solution like that of composition of the above examples except that the triethanolamine is replaced by the same quantity of diethanolamine.

*Example 10*

Results similar to those of examples employing triethanolamine are obtainable by employing a solution like that of composition B in the above examples except that the N,N,N',N' tetra-kis-(2-hydroxypropyl) ethylenediamine is replaced by the same amount of tetraethanol ethylenediamine or tetra-kis N,N,N',N'-(2-hydroxyethyl) ethylenediamine as for example employing the composition of Example 9 or its equivalents as described above.

The process and compositions hereof have many advantages. Thus, my invention affords complete removal of both massive and tightly adherent carbon deposits, which if left on the component part might result in damage to the alloy due to carbide formation and precipitation, and complete removal or such extensive removal of heat scale and conditioning of the remainder of the heat scale to render the latter susceptible to easy removal by simple chemical follow-up cleaning, such as permanganate solution treatment, whenever necessary.

Other advantages include: Rapid removal of leaded deposits on (a) hot parts of jet engines; (b) exhaust sections of turboprop-, turbojet-, and prop-driven aircraft; and power recovery turbine unit (PRT unit) of reciprocating type engines. It has long tank life, and effective performance during life of the bath, when used to remove the stubborn carbon deposits. It is applicable to a wide variety of stainless steels, heat resistant alloys, and superalloys, without incurring measurable chemical attack and without causing corrosion or dimensional loss of these metals. The versatile and extensive cleaning action is achieved by this process by simple immersion in a heated chemical bath, and is far superior to elaborate and only partially effective mechanical methods of cleaning, such as grit blasting, or vapor blasting. Clean surfaces of metal components are produced, suitable for inspection by production-line methods utilizing penetrant dyes or fluorescent materials.

While I have described and illustrated the compositions of my invention as applicable for the removal of carbon deposits from engine parts, as has been previously set forth, the procedures and compositions of my invention are also useful when employed for the removal of carbon deposits formed in other services.

Thus, carbon deposits may be removed from petroleum stills and tar stills, such as carbon deposits present in thermal cracking systems for cracking of hydrocarbon gases or petroleum oils, or from coking stills for oils. It may be used for removal of asphalt and asphaltenes formed in asphalt stills producing either steam refined or oxidized asphalts, particularly those which are hard and highly polymerized, or cracked carbon residues.

Asphalts high in asphaltenes, so highly cracked or oxidized as to resist solution or dispersal in common solvents, may be removed from surfaces containing the same by using the procedures described above, employing the treating materials containing the alkali, salts and organic solvent, particularly the polyalkanolamines. Where the carbon deposit is a highly adherent dense deposit on a metallic surface, I may employ the polyalkanolpolyamines, or suitable mixtures of the polyalkanolpolyamines together with the polyalkanolmonoamines.

The still surfaces may be cleaned by circulating the heated cleaning material over the still surfaces and through the cracking tubes over the surfaces to be cleaned of the carbonaceous deposit.

Other carbonaceous deposits produced by pyrolysis of fats and greases, such as are found on stoves and pots and pans, may also be removed by the above procedures employing the above cleaning agents.

These cleaning procedures are particularly applicable where the metallic surface is not corroded by the alkaline treatment, for example, where the metal is a stainless steel.

Heaters and furnaces in which light petroleum fractions, gas oils, furnace oils, or gases are burned, form carbonaceous deposits on various parts, e. g., nozzles. If such parts can be immersed in the cleaning reagent of the invention, they also may be cleaned of carbon by the above procedures.

In all such cases, heat scale may or may not be present, and usually leaded deposits are not found in such cases. I may, however, employ either the complexing agent or any of the other soluble salts described above if I desire to employ these materials in producing the depression of the vapor pressure of the cleaning solution and increase in boiling point of the cleaning solution as described above.

In all of the preceding examples and uses I may, if I desire, add to the treating solution suitable wetting agents which are stable in the alkaline solution, such as sodium salts of the fatty acids or of the sulfonated fatty acids, or of the alkyl aryl sulfonic acids, or any other alkali stable wetting agent of which the art has many examples, as will be understood by those skilled in this art.

The compositions of my invention may be packaged in an anhydrous condition and dissolved in water to make the treating baths and in said case this invention includes mixtures not in water solution as well as the novel water solutions thereof. The weight percentage of the various components in the anhydrous mixtures are readily ascertainable from the data previously given by simple arithmetical calculation.

The solutions described above may be repeatedly used in the procedures described. After cleaning of the metallic parts the solutions may be repeatedly used on other metallic pieces to be cleaned according to this invention. The partially spent solutions may be fortified by adding additional ingredients to maintain their concentration within the ranges specified, and the fortified solution employed in the above procedures. While the solutions have been described above according to their content when freshly compounded for use according to this invention, this description does not exclude the possibility that transformations during use may occur. Thus, for example, oxidation of the alkanolamines to the corresponding carboxylates may occur in part, and thus the ingredients of the solution be changed in some respects during use without substantially impairing the utility of the solutions for the uses described. Such used solutions are within the scope of the invention disclosed and claimed herein.

While I have described a particular embodiment of my invention for purposes of illustration, it should be understood that various modifications and adaptations thereof may be made within the spirit of the invention as set forth in the appended claims.

The invention claimed is:

1. A method of removing from metal parts carbonaceous deposit formed by the pyrolysis of organic materials, which comprises: contacting said parts at a temperature in the range of about 200° F. to 300° F. with an aqueous solution containing from about 4 to about 40% by weight of the solution of alkali metal hydroxide calculated as alkali metal oxide and from about 5 to about 30% by weight of the solution of a polyalkanolamine having a boiling point in excess of about 400° F., said aqueous solution having a boiling point within the range of from about 220° F. to in excess of 300° F. and higher than the said average temperature, and continuing said treatment until said carbonaceous deposit has been removed, and removing said part from contact with the said solution.

2. A method according to claim 1 wherein the polyalkanolamine is a polyalkanolmonoamine.

3. The method of claim 1 wherein the polyalkanolamine is triethanolamine.

4. The method of claim 1 wherein the polyalkanolamine is diethanolamine.

5. The method of claim 1 wherein the polyalkanolamine is a mixture of polyalkanolmonoamine and polyalkanolpolyamine, and wherein the polyalkanolpolyamine in the solution are in an amount in the range of 0.2 to 5 parts by weight.

6. The method of claim 1 wherein the polyalkanolamine is a mixture of polyalkanolamines comprising N,N,N',N' tetra-kis (2-hydroxypropyl) ethylenediamine, and wherein the amount of the polyalkanolpolyamines in the solution ranges from about 0.2 to about 5 parts by weight.

7. The method of claim 1 wherein the polyalkanolamine is a mixture of polyalkanolamines comprising N,N,N',N' tetra-kis (2-hydroxyethyl) ethylenediamine, and wherein the amount of the polyalkanolpolyamines in the solution ranges from about 0.2 to about 5 parts by weight.

8. The method of claim 1 wherein the polyalkanolamine is a mixture of at least one trialkanolamine and N,N,N',N' tetra-kis (2 hydroxyethyl) ethylene diamine, and wherein the amount of the trialkanolpolyamines in the solution ranges from about 0.2 to about 5 parts by weight.

9. The method of claim 1 wherein the polyalkanolamine is a mixture of at least one trialkanolamine and N,N,N',N' tetra-kis (2-hydroxypropyl) ethylene diamine, and wherein the amount of the alkanolpolyamines in the solution ranges from about 0.2 to about 5 parts by weight.

10. A method of removing a carbonaceous deposit formed by the pyrolysis of organic materials which comprises: contacting said parts at average temperature in the range of about 200° F. to 300° F. with an aqueous solution containing from about 4 to about 40% by weight of the solution of alkali metal hydroxide calculated as alkali metal oxide, and about 1 to about 30% by weight of the solution of polyalkanolamine having a boiling point in excess of about 400° F., said aqueous solution having a boiling point ranging from about 220° F. to in excess of 300° F. and higher than the said average temperature, and continuing said treatment until said carbonaceous deposit has been removed, and removing said part from contact with the said solution.

11. A method according to claim 10, said solution including an alkali metal phenate.

References Cited in the file of this patent

UNITED STATES PATENTS

| | | |
|---|---|---|
| 1,787,789 | Lovell | Jan. 6, 1931 |
| 2,396,938 | Bersworth | Mar. 19, 1936 |
| 2,584,017 | Dvorkovitz | Jan. 29, 1952 |
| 2,615,825 | Heinecke | Oct. 28, 1952 |